United States Patent
Rivera et al.

(10) Patent No.: US 9,065,849 B1
(45) Date of Patent: Jun. 23, 2015

(54) SYSTEMS AND METHODS FOR DETERMINING TRUSTWORTHINESS OF SOFTWARE PROGRAMS

(71) Applicant: Symantec Corporation, Mountain View, CA (US)

(72) Inventors: Shireen H. Rivera, Los Angeles, CA (US); Peter Ashley, Hopkinton, MA (US)

(73) Assignee: Symantec Corporation, Mountain View, CA (US)

(*) Notice: Subject to any disclaimer, the term of this patent is extended or adjusted under 35 U.S.C. 154(b) by 22 days.

(21) Appl. No.: 14/030,745

(22) Filed: Sep. 18, 2013

(51) Int. Cl.
*H04L 29/06* (2006.01)

(52) U.S. Cl.
CPC .................. *H04L 63/145* (2013.01)

(58) Field of Classification Search
CPC .................................................. H04L 63/145
USPC ........................................................ 726/22
See application file for complete search history.

(56) References Cited

U.S. PATENT DOCUMENTS

| | | | |
|---|---|---|---|
| 2006/0212931 A1* | 9/2006 | Shull et al. ................. | 726/10 |
| 2008/0175266 A1* | 7/2008 | Alperovitch et al. ......... | 370/465 |
| 2010/0077479 A1* | 3/2010 | Viljoen ......................... | 726/23 |
| 2011/0040825 A1* | 2/2011 | Ramzan et al. ................. | 709/203 |
| 2011/0067101 A1* | 3/2011 | Seshadri et al. ................ | 726/22 |
| 2011/0099634 A1* | 4/2011 | Conrad et al. ................. | 726/24 |
| 2011/0225655 A1* | 9/2011 | Niemel et al. ................ | 726/24 |
| 2012/0174219 A1* | 7/2012 | Hernandez et al. ............. | 726/22 |
| 2012/0246598 A1* | 9/2012 | Narayanan .................... | 715/846 |
| 2012/0246721 A1* | 9/2012 | Viljoen ......................... | 726/22 |
| 2013/0097660 A1* | 4/2013 | Das et al. ........................ | 726/1 |
| 2013/0111547 A1* | 5/2013 | Kraemer ......................... | 726/1 |
| 2013/0254880 A1* | 9/2013 | Alperovitch et al. .......... | 726/22 |
| 2014/0115652 A1* | 4/2014 | Kapoor et al. .................. | 726/1 |
| 2014/0283065 A1* | 9/2014 | Teddy et al. .................... | 726/23 |
| 2014/0283066 A1* | 9/2014 | Teddy et al. .................... | 726/23 |

OTHER PUBLICATIONS

Rsaska; "In the Cloud" vs "Reputation Database"; Symantec Connect Community; http://www.symantec.com/connect/forums/cloud-vs-reputation-database; as accessed on Jul. 24, 2013.

* cited by examiner

*Primary Examiner* — Michael Pyzocha
(74) *Attorney, Agent, or Firm* — ALG Intellectual Property, LLC (57) ABSTRACT

A computer-implemented method for determining trustworthiness of software programs may include (1) determining, for at least one software program, a prevalence score that indicates a prevalence of the software program within a local network, (2) obtaining, for the software program, a reputation score that indicates a reputation of the software program, (3) determining a trustworthiness of the software program based on both the reputation score of the software program and the prevalence score of the software program, and (4) performing a security action based on the trustworthiness of the software program. Various other methods, systems, and computer-readable media are also disclosed.

20 Claims, 5 Drawing Sheets

SYSTEMS AND METHODS FOR DETERMINING TRUSTWORTHINESS OF SOFTWARE PROGRAMS

BACKGROUND

As the types of threats to the security of computing devices have changed and grown more sophisticated, techniques for detecting threats have likewise evolved. For example, the emergence of advanced persistent threats (APTs)—malware custom-designed for a specific target—may pose particular problems, since an APT may be unknown to malware detection tools. As another example, malware designed to conceal its presence on a computing device (e.g., a rootkit), may also evade detection by traditional scanning mechanisms.

Organizations increasingly turn to white lists, application inventories, and software analysis techniques to identify new malware threats and to limit execution of software to software programs known to be safe. Unfortunately, these approaches may yield frequent false positive results or may interrupt the normal use of legitimate software programs, particularly programs unique to an organization or small number of users.

In view of the above, the instant disclosure identifies a need for additional and improves systems and methods for determining the trustworthiness of software programs.

SUMMARY

As will be described in greater detail below, the instant disclosure generally relates to systems and methods for determining trustworthiness of software programs by combining prevalence data for software programs within a local network with reputation data for the same software programs from outside the local network and/or with the results of a malware deep scan.

In one example, a computer-implemented method for determining trustworthiness of software programs may include (1) determining, for at least one software program, a prevalence score that indicates a prevalence of the software program within a local network, (2) obtaining, for the software program, a reputation score that indicates a reputation of the software program, (3) determining a trustworthiness of the software program based on both the reputation score of the software program and the prevalence score of the software program, and (4) performing a security action based on the trustworthiness of the software program.

In one embodiment, obtaining the reputation score may include determining a prevalence of the software program outside the local network, and the reputation score may indicate the prevalence of the software program outside the local network. In some examples, determining the trustworthiness of the software program may include: (1) determining that prevalence of the software program in the local network is greater than prevalence of the software program outside the local network, and (2) determining, based the prevalence of the software program being greater inside the local network than outside the local network, that the software program is likely an internal program for the local network and does not constitute a malware threat.

In one embodiment, obtaining the reputation score may include conducting a malware deep scan on one or more devices in the local network to determine whether the software program potentially includes malware, and the reputation score may be based, at least in part, on a result of the malware deep scan. In some examples, conducting the malware deep scan may include searching for rootkit threats on the one or more devices in the local network.

In some examples, determining the trustworthiness of the software program may include: (1) determining that the prevalence score indicates that the software program has not been identified within the local network (the prevalence score may be based on an inventory of software programs used within the local network), (2) determining that the software program was identified during the malware deep scan, and (3) determining, based on the software program not being identified in the inventory of software programs and being identified during the malware deep scan, that the software program may include a rootkit threat.

According to various embodiments, determining the trustworthiness of the software program may include: (1) determining that the prevalence score indicates that the software program was not identified as a malware threat during an antivirus scan conducted within the local network, (2) determining that the software program was identified during the malware deep scan, and (3) determining, based on the software program not being identified during the antivirus scan and being identified during the malware deep scan, that the software program may comprise a rootkit threat.

Additionally or alternatively, determining the trustworthiness of the software program may include: (1) determining that the prevalence score is below a threshold and indicates low prevalence of the software program in the local network, (2) determining that the reputation score indicates that the software program has not been identified outside the local network, and (3) determining, based on the low prevalence of the software program in the local network and absence of the software program outside the local network, that the software program may include an advanced persistent threat.

As another example, determining the trustworthiness of the software program may include: (1) determining that the prevalence score is below a local-prevalence threshold and indicates low prevalence of the software program in the local network, (2) determining that the reputation score indicates that prevalence of the software program outside the local network is above a global-prevalence threshold and is therefore high, and (3) determining, based on the low prevalence of the software program in the local network and the high prevalence of the software program outside the local network, that the software program does not include a malware threat.

In some examples, determining the trustworthiness of the software program may include: (1) determining that the prevalence score is below a local-prevalence threshold and indicates low prevalence of the software program in the local network, (2) determining that the reputation score indicates that prevalence of the software program outside the local network is below a global-prevalence threshold and is therefore low, and (3) determining, based on the low prevalence of the software program in the local network and the low prevalence of the software program outside the local network, that the software program may include a malware threat.

In various embodiments, determining the trustworthiness of the software program may include: (1) determining that the prevalence score is below a local-prevalence threshold and indicates low prevalence of the software program in the local network, (2) determining that the reputation score indicates that the software program violates a policy of the local network, and (3) determining, based on the low prevalence of the software program in the local network and the software program violating a policy of the local network, that the software program may pose a threat to the local network.

In some embodiments, determining the trustworthiness of the software program may include: (1) determining that the prevalence score is below a local-prevalence threshold and indicates low prevalence of the software program in the local network, (2) determining that that the reputation score indicates that prevalence of the software program outside the local network is above a global-prevalence threshold and is therefore high, and (3) determining, based on the low prevalence of the software program in the local network and the high prevalence of the software program outside the local network, that the software program represents a potential compliance risk for the local network.

In one embodiment, a system for implementing the above-described method may include (1) a prevalence module that determines, for at least one software program, a prevalence score that indicates a prevalence of the software program within a local network, (2) a reputation module that obtains, for the software program, a reputation score that indicates a reputation of the software program, (3) a trustworthiness module that determines a trustworthiness of the software program based on both the reputation score of the software program and the prevalence score of the software program, (4) a security module that performs a security action based on the trustworthiness of the software program, and (5) at least one processor configured to execute the prevalence module, the reputation module, the trustworthiness module, and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) determine, for at least one software program, a prevalence score that indicates a prevalence of the software program within a local network, (2) obtain, for the software program, a reputation score that indicates a reputation of the software program, (3) determine a trustworthiness of the software program based on both the reputation score of the software program and the prevalence score of the software program, and (4) perform a security action based on the trustworthiness of the software program.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining trustworthiness of software programs. As will be explained in greater detail below, the systems and methods described herein may leverage both prevalence information and reputation information to identify potential security threats. Embodiments of the instant disclosure may identify security threats with increased accuracy while reducing the incidence of false positive results. The systems and methods described herein may also provide various other features and advantages.

Figure 1:
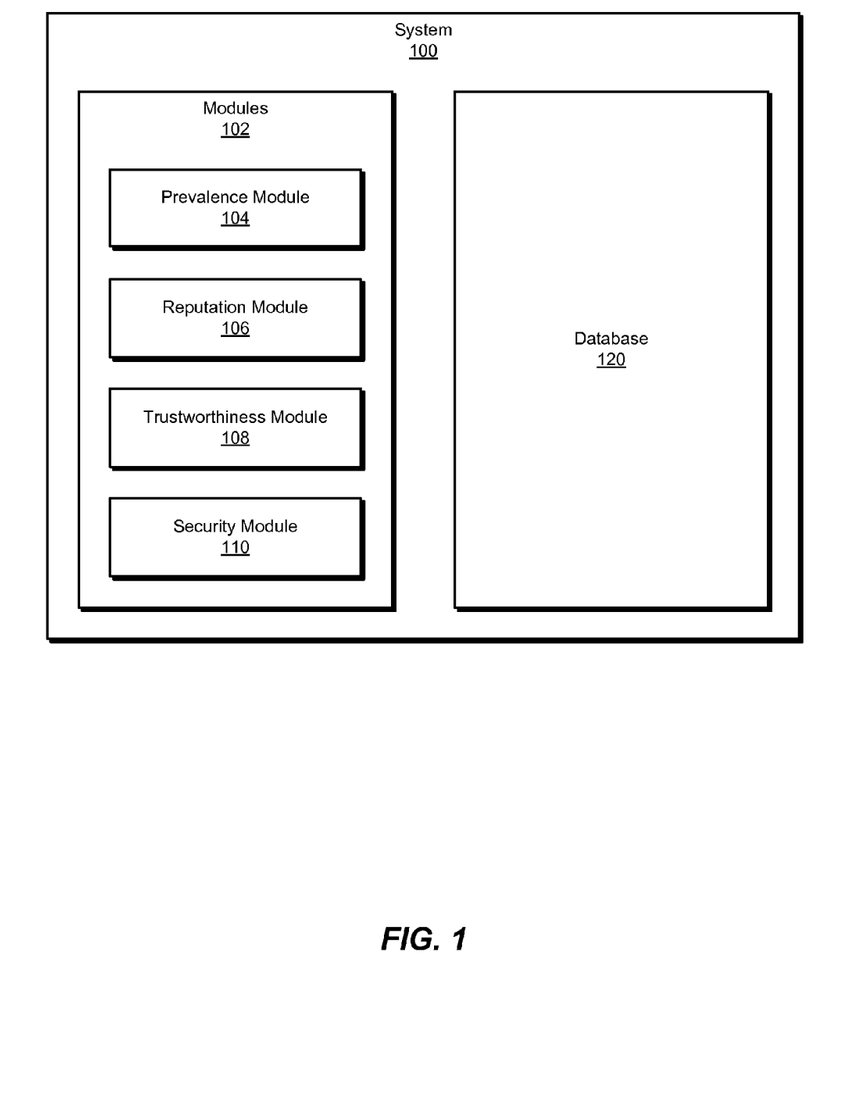
FIG. 1 is a block diagram of an exemplary system for determining trustworthiness of software programs.
Figure 2:
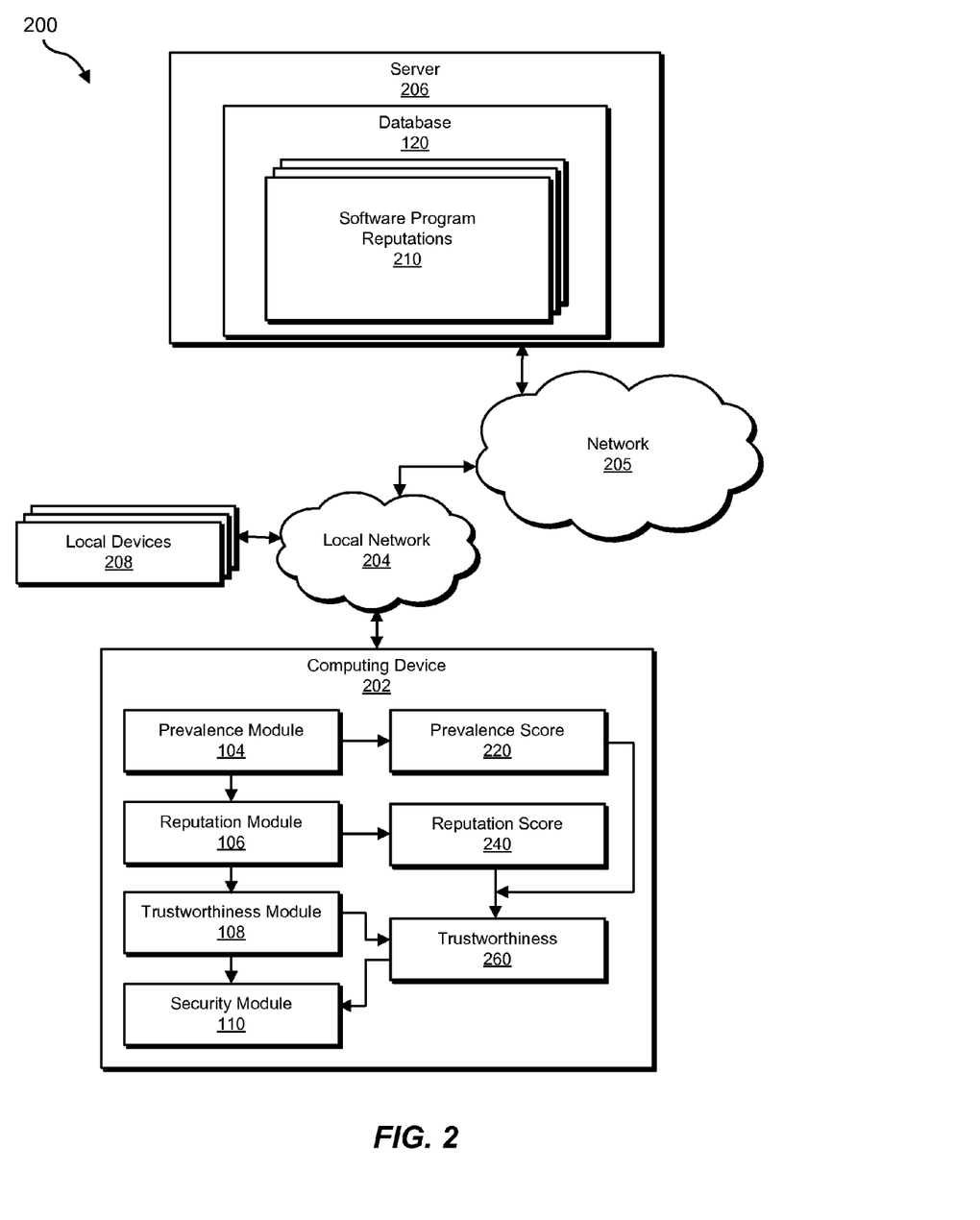
FIG. 2 is a block diagram of another exemplary system for determining trustworthiness of software programs.

The following will provide, with reference to FIGS. 1-2, detailed descriptions of exemplary systems for determining trustworthiness of software programs. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for determining trustworthiness of software programs. As illustrated in this figure, exemplary system 100 may include one or more modules 102 for performing one or more tasks. For example, and as will be explained in greater detail below, exemplary system 100 may include a prevalence module 104 that may determine, for at least one software program, a prevalence score that indicates a prevalence of the software program within a local network. Exemplary system 100 may additionally include a reputation module 106 that may obtain, for the software program, a reputation score that indicates a reputation of the software program.

In addition, and as will be described in greater detail below, exemplary system 100 may include a trustworthiness module 108 that determines a trustworthiness of the software program based on both the reputation score and the prevalence score of the software program. Exemplary system 100 may also include a security module 110 that may perform a security action based on the trustworthiness of the software program. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. As will be described in greater detail below, database 120 may be configured to store reputation scores and/or prevalence data for software programs.

Database 120 may represent portions of a single database or computing device or a plurality of databases or computing devices. For example, database 120 may represent a portion of server 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with local devices 208 within a local network 204. Local devices 208 and/or computing device 202 may also communicate with server 206 via a network 205. Alternatively, server 206 may be within local network 204.

Computing device 202 may be programmed with one or more of modules 102 and/or may store all or a portion of the data in database 120. Additionally or alternatively, server 206 or local devices 208 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to determine trustworthiness of software programs. For example, and as will be described in greater detail below, prevalence module 104 may be programmed to determine, for at least one software program, a prevalence score 220 that indicates a prevalence of a software program within a local network (e.g., local network 204). Reputation module 106 may be programmed to obtain, for the software program, a software program reputation 210 that indicates a reputation of the software program. Trustworthiness module 108 may be programmed to determine a trustworthiness 260 of the software program based on both the reputation score of the software program and the prevalence score of the software program. Security module 110 may be programmed to perform a security action based on the trustworthiness of the software program.

Computing device 202 and local devices 208 generally represent any type or form of computing devices capable of reading computer-executable instructions. Any number of local devices 208 may be part of local network 204. Examples of computing device 202 and local devices 208 include, without limitation, laptops, tablets, desktops, servers, cellular phones, Personal Digital Assistants (PDAs), multimedia players, embedded systems, combinations of one or more of the same, exemplary computing system 410 in FIG. 4, or any other suitable computing device.

Networks 204 and 205 generally represent any medium or architecture capable of facilitating communication or data transfer. Examples of network 204 include a Local Area Network (LAN), a Personal Area Network (PAN), a private network, a virtual private network, and/or any other type or form of local, secure, and/or private network. Examples of network 205 include, without limitation, an intranet, a Wide Area Network (WAN), the Internet, Power Line Communications (PLC), a cellular network (e.g., a Global System for Mobile Communications (GSM) network), exemplary network architecture 500 in FIG. 5, or the like. Networks 204 and 205 may facilitate communication or data transfer using wireless or wired connections.

Server 206 generally represents any type or form of computing device that is capable of storing, comparing, and/or providing data. Examples of server 206 include, without limitation, application servers and database servers configured to provide various database services and/or run certain software applications.

Figure 3:
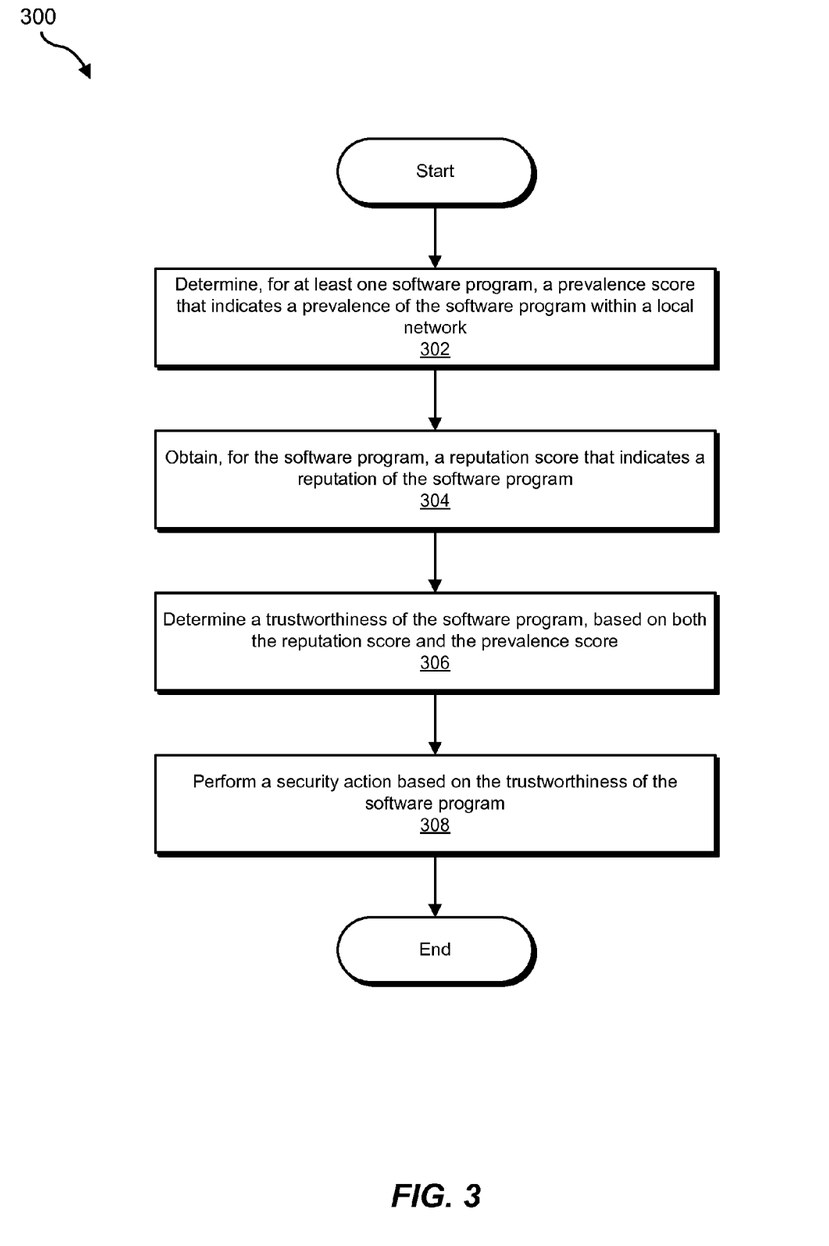
FIG. 3 is a flow diagram of an exemplary method for determining trustworthiness of software programs.

FIG. 3 is a flow diagram of an exemplary computer-implemented method 300 for determining trustworthiness of software programs. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may determine, for at least one software program, a prevalence score that indicates a prevalence of a software program within a local network. For example, at step 302 prevalence module 104 may determine, as part of computing device 202 in FIG. 2, a prevalence score that indicates a prevalence of a software program on local devices 208 within local network 204.

As used herein, the phrase "prevalence score" generally refers to a measure of how common a software program is within a local network. For example, a prevalence score may represent the percentage of devices within the local network on which the software program is present. Additionally or alternatively, a prevalence score may indicate how many instances of a software program are installed within a local network.

As used herein, the phrase "software program" generally refers to any type or form of executable code (i.e., sequence of computer-readable instructions). Software programs may include, without limitation, system software, application software, utility programs, productivity programs, entertainment programs, and/or any other type of computer application.

The systems described herein may determine a prevalence score in a variety of ways. In some examples, prevalence module 104 may take an inventory of software programs installed on local devices 208 within local network 204. Prevalence module 104 may take an inventory of software programs installed on local devices 208 by querying local devices 208, by performing a remote scan of local devices 208, by querying an application inventory system for inventory data about software applications installed within local network 204, and/or in any other suitable manner.

Prevalence module 104 may use an inventory of software installed within local network 204 to identify, infer, create, calculate, or otherwise establish a prevalence score for one or more software applications. For example, prevalence module 104 may calculate a percentage of local devices 208 on which a software program is installed. Alternatively, prevalence module 104 may determine a total number of instances of the software program that are installed on local devices 208.

In some embodiments, as discussed in greater detail below, prevalence module 104 may use the results of a malware scan that is not a deep scan, such as a signature-based anti-virus scan, to determine the prevalence of a software program within the local network.

Returning to FIG. 3, at step 304 one or more of the systems described herein may obtain, for the software program, a reputation score that indicates a reputation of the software program. For example, at step 304 reputation module 106 may, as part of computing device 202 in FIG. 2, obtain, for the software program, a reputation score 210 that indicates a reputation of the software program.

The phrase "reputation score," as used herein, generally refers to one or more metrics indicative of a trustworthiness, prevalence, prominence, community opinion, and/or reputation of a software application. A reputation score may be based on a variety of factors, such as the percentage of devices or number of devices on which the software program is installed (e.g., prevalence of the software program in a wide area network, prevalence of the software program on the Internet, prevalence of the software program on devices and networks outside local network 204, etc.), the length of time the software program has been in use on one or more devices, an indication of the reliability of the publisher or developer of the software program, an indication of whether the software program may contain malware, a community rating of the software program, an evaluation of the software program by a trusted entity, and/or any other suitable factor. In some embodiments, two or more factors of a reputation score may be weighted and combined to yield a single numerical value.

The systems described herein may obtain a reputation score in a variety of ways. In one embodiment, reputation module 106 may query database 120 to obtain a software program reputation (e.g., from software program reputations 210) associated with a software program in question. In some embodiments, software program reputations 210 may represent the prevalence of the software programs outside of local network 204, calculated as a total number of installations or a percentage of devices surveyed outside local network 204 on which the software program is installed. In another embodiment, software program reputations 210 may include a composite of several factors, such as the prevalence of software programs outside local network 204, the length of time a software program has been installed on one or more devices, a measure of the reliability of the publisher of the software program, and/or a measure of the number of incidents in which the software program has been associated with malware.

In one embodiment, obtaining the reputation score may include conducting a malware deep scan on one or more devices in the local network to determine whether the software program potentially includes malware. The reputation score may be based, at least in part, on a result of the malware deep scan. Reputation module 106 may, for example, conduct a malware deep scan of local devices 208 on local network 204 to identify, on the local devices, malware such as viruses, worms, Trojan horses, rootkits, key loggers, adware, and advanced persistent threats (APTs). In some examples, reputation module 106 may also identify unwanted software programs, such as unlicensed software programs or software programs restricted by administrator policy.

As used herein, the phrase "malware deep scan" generally refers to any suitable type or form of malware scan of one or more devices within a local network. For example, a malware deep scan may include an analysis of all running processes on one or more devices, verification of the integrity of operating systems and device drivers on one or more devices, an analysis of installed software programs and files that may contain potentially malicious executable code (e.g., as macros or scripts), a malware scan capable of detecting threats that are difficult to identify (e.g., rootkits, advanced persistent threats, etc.), and/or any other type of scan or analysis of one or more devices within a network.

As noted, conducting a malware deep scan may include searching for rootkit threats on the one or more devices in a local network. For example, reputation module 106 may search for rootkit programs installed on local devices 208 within local network 204. Searches for rootkit programs may be conducted in any suitable manner, including signatures searches, integrity checking, difference-based detection, behavioral detection, detection of hooked functions, and/or forensic scanning of memory.

As used herein, the term "rootkit" generally refers to a form of malware designed to provide privileged access to a device while avoiding detection by security tools. Rootkits may avoid detection by modifying the behavior of parts of an operating system, concealing running processes from system monitoring tools, hiding system files and other configuration data, and/or disabling or modifying event logging.

Returning to FIG. 3, at step 306 one or more of the systems described herein may determine a trustworthiness of the software program based on both the reputation score of the software program and the prevalence score of the software program. For example, at step 306 trustworthiness module 108 may, as part of computing device 202 in FIG. 2, determine a trustworthiness of the software program based on both the reputation score and local prevalence (i.e., prevalence on local devices 208 in local network 204) of the software program. As used herein, the term "trustworthiness" generally refers to a determination of how to classify a software program (e.g., as trusted, suspicious, malicious, etc.), where the determination is based on both reputation and prevalence information.

Trustworthiness module 108 may determine the trustworthiness of the software program in a variety of ways. In some examples, trustworthiness module 108 may determine that prevalence of the software program in local network 204 is greater than prevalence of the software program outside local network 204. Based the prevalence of the software program being greater inside the local network than outside the local network, trustworthiness module 108 may determine that the software program is likely an internal program for the local network and is not a malware threat. Trustworthiness module 108 may make this determination based on the observation that the software program has an established reputation outside the local network and is widely used within the local network. Situations of this type may arise when a software program for a particular application is used by many members of a particular type of organization. For example, many employees of an architecture firm may use a particular architectural drafting application that may be found, but not widely used, outside the firm. By determining that the software program has an established reputation outside the local network, trustworthiness module 108 may avert the possibility of a false positive malware detection for the software program.

In some examples, determining the trustworthiness of the software program may include determining that the prevalence score indicates that the software program has not been identified within the local network but that the software program was identified during a malware deep scan. For example, the prevalence score may be based on an inventory of software programs used within the local network, and the inventory may indicate that the software program has not been identified in the local network. Based on the software program not being identified in the inventory of software programs and being identified during the malware deep scan, trustworthiness module 108 may determine that the software program may include a rootkit threat or other hidden malware threat. Trustworthiness module 108 may make this determination based on the observation that the software program apparently concealed its presence from the inventory of software programs but was not able to conceal its presence from the malware deep scan. As another example, the prevalence score may be based on the results of an antivirus scan (e.g., a signature-based scan that scans for malware using malware signatures), and the prevalence score may indicate that the scan did not identify the software program as a malware threat. Based on the software program not being identified in the signature-based scan but being identified during the malware deep scan, trustworthiness module 108 may determine that the software program may include a rootkit threat or other hidden malware threat.

In other examples, determining the trustworthiness of the software program may include determining that the prevalence score is below a threshold and indicates low prevalence of the software program in the local network, and determining that the reputation score indicates that the software program has not been identified outside the local network. Based on the low prevalence of the software program in the local network and absence of the software program outside the local network, trustworthiness module 108 may determine that the software program may include an advanced persistent threat. Trustworthiness module 108 may make this determination based on the observation that the software program is found only within the local network. The software program may be an internally-developed, proprietary application, but because the possibility also exists that the software program represents an advanced persistent threat, trustworthiness module 108 may indicate the need for and/or may perform additional analysis on the software program.

The phrase, "advanced persistent threat," or acronym "APT," as used herein, generally refers to a security threat to a computing system originating from a sophisticated and well-provided entity, such as a government. An APT may be a software program custom-designed to take advantage of known vulnerabilities of a target organization.

Determining the trustworthiness of a software program may, in some examples, include determining that the prevalence score is below a local-prevalence threshold and indicates low prevalence of the software program in the local network, and determining that the reputation score indicates that prevalence of the software program outside the local network is above a global-prevalence threshold and is therefore high. Based on the low prevalence of the software program in the local network and the high prevalence of the software program outside the local network, trustworthiness module 108 may determine that the software program does not constitute a malware threat. Trustworthiness module 108 may make this determination based on the observation that the software program has an established reputation outside the local network, despite the fact that it is not widely used within the local network. By determining that the software program has an established reputation outside the local network, trustworthiness module 108 may avert the possibility of a false positive malware detection for the software program.

Alternatively, trustworthiness module 108 may determine, based on low prevalence of the software program in the local network and high prevalence of the software program outside the local network, that the software program represents a potential compliance risk for the local network. A software program that represents a compliance risk to the local network may be an unwanted, undesirable, and/or non-standard (e.g., within the local network) software program that may not comply with network policies and/or industry standards. For example, a software program that represents a potential compliance risk for the local network may be a software program that fails to comply with data loss prevention standards (e.g., the Health Insurance Portability and Accountability Act (HIPAA), Payment Card Industry (PCI) standards, etc.) and/or that poses any other type of data leak risk.

In other examples, determining the trustworthiness of the software program may include determining that the prevalence score is below a local-prevalence threshold and indicates low prevalence of the software program in the local network, and determining that the reputation score indicates that prevalence of the software program outside the local network is below a global-prevalence threshold and is therefore low. Based on the low prevalence of the software program in the local network and the low prevalence of the software program outside the local network, trustworthiness module 108 may determine that the software program may constitute a malware threat. Trustworthiness module 108 may make this determination based on the observation that the software program does not have an established reputation either within the local network or outside the local network. In some embodiments, trustworthiness module 108 may indicate the need for and/or may perform additional analysis on the software program in this situation.

In other examples, determining the trustworthiness of the software program may include determining that the prevalence score is below a local-prevalence threshold and indicates low prevalence of the software program in the local network and also determining that the software program violates a policy of the local network. In this example, local network policies may include policies that prohibit certain software programs or types of software programs from being installed within the local network, policies that restrict how or where certain software programs are installed or used, data loss prevention policies, and/or any other type or form of policy regarding the presence of a software program within a local network.

Based on the determination that the software program is found within the local network but violates a policy of the local network, trustworthiness module 108 may determine that the software program may constitute a threat to the security and/or performance of the local network. A software program that may pose a threat to a network may be a software program that includes malware and/or a software program that represents a potential compliance risk, as described above.

Returning to FIG. 3, at step 308 one or more of the systems described herein may perform a security action based on the trustworthiness of the software program. For example, at step 308 security module 110 may, as part of computing device 202 in FIG. 2, perform a security action based on the trustworthiness of a software application found within local network 204.

The systems described herein may perform the security action in any suitable manner. For example, security module 110 may permit the software program to be executed within local network 204 if the software program is not a malware threat and/or is determined to be trusted. If the software program is not trustworthy, security module 110 may transmit a security alert concerning the software program to a network administrator or to users of local devices 208 on which the software program is installed. Security module 110 may also delete the software program or block execution or network access by the software program. Security module 110 may also initiate an update of security programs within the local network to protect devices within the local network from future infection by an identified malware threat. In some embodiments, security module 110 may indicate that the operating system of a device should be reinstalled to address a threat such as a rootkit threat. In some embodiments, security module 110 may perform one or more security actions as part of applying a security policy set by administrators of the local network.

As explained above, the systems and methods described herein may aid in the discovery of malware or unwanted software programs by combining the results of an application inventory program with software program reputation data. Analysis combining the two data sets may identify potential threats with increased accuracy by eliminating false positive results. The results of a malware deep scan may also contribute to the assessment of software programs found in the local network, particularly in the detection of advanced persistent threats and rootkits.

Figure 4:
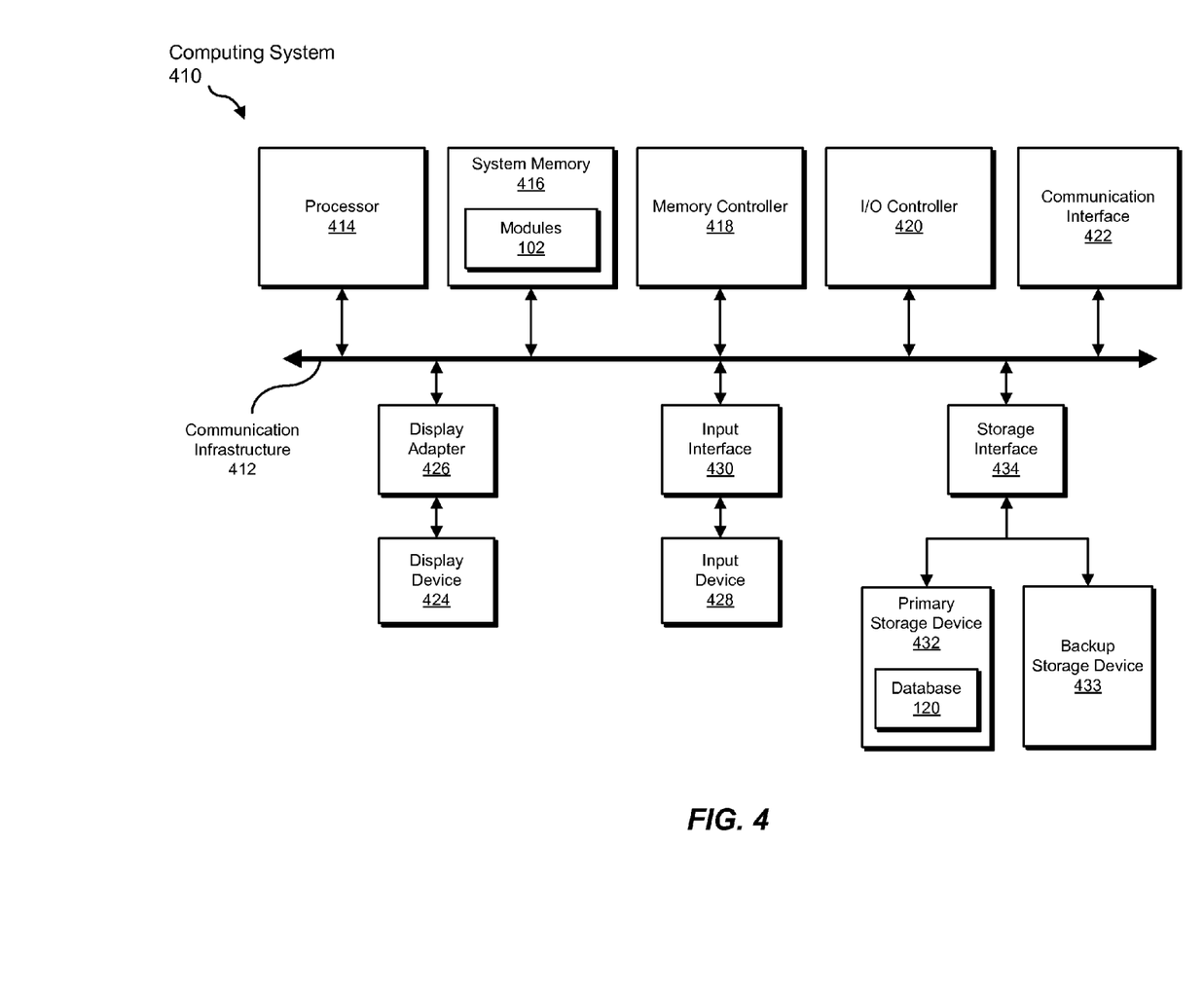
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410.

Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 410. All or a portion of the computer program stored on the computer-readable-storage medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
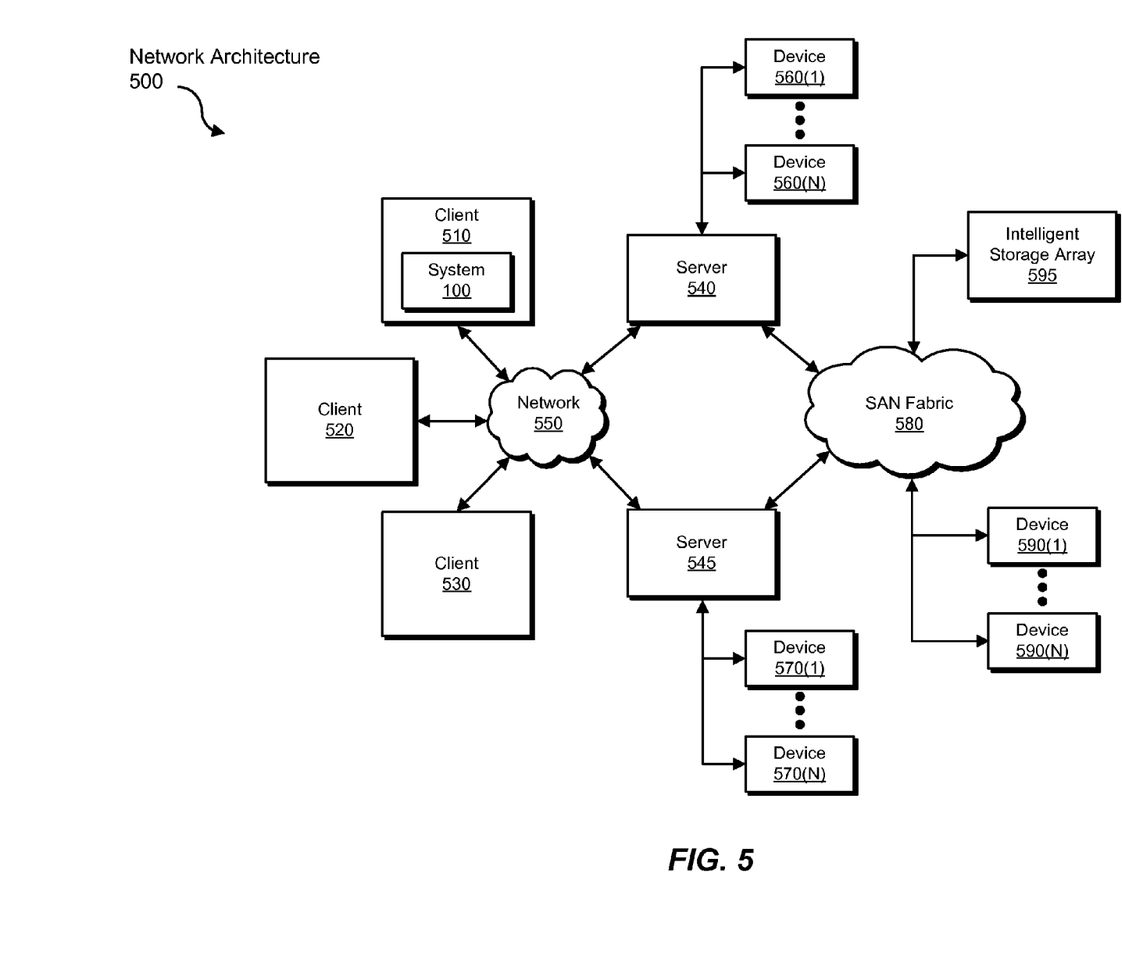
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for determining trustworthiness of software programs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for determining the trustworthiness of software programs. In some embodiments, one or more of the modules recited herein may transform prevalence scores and reputation scores into a trustworthiness score. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining trustworthiness of software programs, at least a portion of the method being performed by a computing device comprising at least one processor, the method comprising:
    determining, for at least one software program, a prevalence score that indicates a prevalence of the software program within a local network;
    obtaining, for the software program, a reputation score that indicates a prevalence of the software program outside the local network;
    comparing the prevalence score with the reputation score to a determine trustworthiness of the software program based on both the reputation score of the software program and the prevalence score of the software program;
    performing a security action based on the trustworthiness of the software program.

2. The computer-implemented method of claim 1, wherein the prevalence score comprises at least one of:
    a percentage of devices within the local network on which the software program is present;
    a number of instances of the software program installed within the local network.

3. The computer-implemented method of claim 1, wherein comparing the prevalence score with the reputation score to determine the trustworthiness of the software program comprises:
    determining, based on the prevalence score and the reputation score, that the prevalence of the software program in the local network is greater than the prevalence of the software program outside the local network;
    determining, based the prevalence of the software program being greater inside the local network than outside the local network, that the software program is likely an internal program for the local network and does not comprise a malware threat.

4. The computer-implemented method of claim 1, wherein obtaining the reputation score comprises:
    calculating a total number of devices surveyed outside the local network on which the software program is installed;
    calculating a percentage of devices surveyed outside the local network on which the software program is installed.

5. The computer-implemented method of claim 1, further comprising:
    conducting a malware deep scan on one or more devices in the local network to determine whether the software program potentially comprises malware;
    determining that the prevalence score indicates that the software program has not been identified within the local network, wherein the prevalence score is based on an inventory of software programs used within the local network;
    determining that the software program was identified during the malware deep scan;
    determining, based on the software program not being identified in the inventory of software programs and being identified during the malware deep scan, that the software program may comprise a rootkit threat;
    wherein the trustworthiness determination is further based on the determination that the software program may comprise the rootkit threat.

6. The computer-implemented method of claim 1, wherein determining the prevalence score comprises taking an inventory of software programs installed on local devices within the local network by at least one of:
    querying the local devices;
    performing a remote scan of the local devices;
    querying an application inventory system for inventory data about software applications installed within the local network.

7. The computer-implemented method of claim 1, wherein comparing the prevalence score with the reputation score to determine the trustworthiness of the software program comprises:
    determining that the prevalence score is below a threshold and indicates low prevalence of the software program in the local network;

determining that the reputation score indicates that the software program has not been identified outside the local network;

determining, based on the low prevalence of the software program in the local network and absence of the software program outside the local network, that the software program may comprise an advanced persistent threat.

8. The computer-implemented method of claim 1, wherein comparing the prevalence score with the reputation score to determine the trustworthiness of the software program comprises:

determining that the prevalence score is below a local-prevalence threshold and indicates low prevalence of the software program in the local network;

determining that the reputation score indicates that the prevalence of the software program outside the local network is above a global-prevalence threshold and is therefore high;

determining, based on the low prevalence of the software program in the local network and the high prevalence of the software program outside the local network, that the software program does not comprise a malware threat.

9. The computer-implemented method of claim 1, wherein comparing the prevalence score with the reputation score to determine the trustworthiness of the software program comprises:

determining that the prevalence score is below a local-prevalence threshold and indicates low prevalence of the software program in the local network;

determining that the reputation score indicates that the prevalence of the software program outside the local network is below a global-prevalence threshold and is therefore low;

determining, based on the low prevalence of the software program in the local network and the low prevalence of the software program outside the local network, that the software program may comprise a malware threat.

10. A system for determining trustworthiness of software programs, the system comprising:

a prevalence module, stored in memory, that determines, for at least one software program, a prevalence score that indicates a prevalence of the software program within a local network;

a reputation module, stored in memory, that obtains, for the software program, a reputation score that indicates a prevalence of the software program outside the local network;

a trustworthiness module, stored in memory, that compares the prevalence score with the reputation score to determine a trustworthiness of the software program based on both the reputation score of the software program and the prevalence score of the software program;

a security module, stored in memory, that performs a security action based on the trustworthiness of the software program;

at least one hardware processor that executes the prevalence module, the reputation module, the trustworthiness module, and the security module.

11. The system of claim 10, wherein the prevalence score comprises at least one of:

a percentage of devices within the local network on which the software program is present;

a number of instances of the software program installed within the local network.

12. The system of claim 10, wherein the trustworthiness module compares the prevalence score with the reputation score to determine the trustworthiness of the software program by:

determining, based on the prevalence score and the reputation score, that prevalence of the software program in the local network is greater than the prevalence of the software program outside the local network;

determining, based the prevalence of the software program being greater inside the local network than outside the local network, that the software program is likely an internal program for the local network and does not comprise a malware threat.

13. The system of claim 10, wherein the reputation module obtains the reputation score by:

calculating a total number of devices surveyed outside the local network on which the software program is installed;

calculating a percentage of devices surveyed outside the local network on which the software program is installed.

14. The system of claim 10, wherein the trustworthiness module determines the trustworthiness of the software program by:

determining that the prevalence score is below a local-prevalence threshold and indicates low prevalence of the software program in the local network;

determining that the reputation score indicates that the prevalence of the software program outside the local network is below a global-prevalence threshold and is therefore low;

determining, based on the low prevalence of the software program in the local network and the low prevalence of the software program outside the local network, that the software program does not comprise a malware threat.

15. The system of claim 13, wherein the prevalence module determines the prevalence score by taking an inventory of software programs installed on local devices within the local network by at least one of:

querying the local devices;

performing a remote scan of the local devices;

querying an application inventory system for inventory data about software applications installed within the local network.

16. The system of claim 10, wherein trustworthiness module compares the prevalence score with the reputation score to determine the trustworthiness of the software program by:

determining that the prevalence score is below a threshold and indicates low prevalence of the software program in the local network;

determining that the reputation score indicates that the software program has not been identified outside the local network;

determining, based on the low prevalence of the software program in the local network and absence of the software program outside the local network, that the software program may comprise an advanced persistent threat.

17. The system of claim 10, wherein the trustworthiness module compares the prevalence score with the reputation score to determine the trustworthiness of the software program by:

determining that the prevalence score is below a local-prevalence threshold and indicates low prevalence of the software program in the local network;

determining that the reputation score indicates that the prevalence of the software program outside the local network is above a global-prevalence threshold and is therefore high;

determining, based on the low prevalence of the software program in the local network and the high prevalence of the software program outside the local network, that the software program does not comprise a malware threat.

18. The system of claim 10, wherein the trustworthiness module compares the prevalence score with the reputation score to determine the trustworthiness of the software program by:

determining that the prevalence score is below a local-prevalence threshold and indicates low prevalence of the software program in the local network;

determining that the reputation score indicates that the prevalence of the software program outside the local network is above a global-prevalence threshold and is therefore high;

determining, based on the low prevalence of the software program in the local network and the high prevalence of the software program outside the local network, that the software program represents a potential compliance risk for the local network.

19. The system of claim 10, wherein the trustworthiness module further determines the trustworthiness of the software program by:

determining that the prevalence score is below a local-prevalence threshold and indicates low prevalence of the software program in the local network;

determining that the reputation score indicates that the software program violates a policy of the local network;

determining, based on the low prevalence of the software program in the local network and the software program violating the policy of the local network, that the software program potentially poses a threat to the local network.

20. A non-transitory computer-readable medium comprising one or more computer-executable instructions that, when executed by at least one processor of a computing device, cause the computing device to:

determine, for at least one software program, a prevalence score that indicates a prevalence of the software program within a local network;

obtain, for the software program, a reputation score that indicates a prevalence of the software program outside the local network;

compare the prevalence score with the reputation score to determine a trustworthiness of the software program based on both the reputation score of the software program and the prevalence score of the software program;

perform a security action based on the trustworthiness of the software program.

* * * * *

UNITED STATES PATENT AND TRADEMARK OFFICE
CERTIFICATE OF CORRECTION

PATENT NO. : 9,065,849 B1  
APPLICATION NO. : 14/030745  
DATED : June 23, 2015  
INVENTOR(S) : Shireen H. Rivera and Peter Ashley Page 1 of 1

It is certified that error appears in the above-identified patent and that said Letters Patent is hereby corrected as shown below:

In the claims

Claim 1, at column 17, line 67, should read:
to determine a trustworthiness of the software program Claim 3, at column 18, line 19, should read:
determining, based on the prevalence of the software program Claim 12, at column 20, line 9, should read:
determining, based on the prevalence of the software program Claim 16, at column 20, lines 45 to 46, should read:
The system of claim 10, wherein the trustworthiness module compares the prevalence score with the reputation score to Signed and Sealed this
Fifteenth Day of March, 2016

Michelle K. Lee
*Director of the United States Patent and Trademark Office*